(12) United States Patent
Sukup

(10) Patent No.: US 6,851,847 B2
(45) Date of Patent: Feb. 8, 2005

(54) ADJUSTABLE GRAIN BIN RAIL FOR GRAIN STIRRING MACHINES

(75) Inventor: Eugene G. Sukup, Hampton, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 128 days.

(21) Appl. No.: 10/279,617

(22) Filed: Oct. 24, 2002

(65) Prior Publication Data
US 2004/0081016 A1 Apr. 29, 2004

(51) Int. Cl.$^7$ ................................................. B01F 15/00
(52) U.S. Cl. ........................................................ 366/261
(58) Field of Search ............................ 366/65–66, 261, 366/266, 279, 285, 318, 341, 346; 238/230, 231, 236, 238

(56) References Cited

U.S. PATENT DOCUMENTS

| | | | | |
|---|---|---|---|---|
| 1,019,573 A | * | 3/1912 | Whitlow | 238/231 |
| 1,132,461 A | * | 3/1915 | Dimm | 238/236 |
| 1,365,941 A | * | 1/1921 | Joseph | 238/236 |
| 4,162,857 A | * | 7/1979 | Spurling | 366/261 |
| 4,836,686 A | * | 6/1989 | Sukup | 366/261 |
| 4,854,719 A | * | 8/1989 | Sukup | 366/261 |

FOREIGN PATENT DOCUMENTS

| | | | |
|---|---|---|---|
| JP | 6-197625 | * | 7/1994 |
| JP | 10-85512 | * | 4/1998 |

* cited by examiner

Primary Examiner—Charles E. Cooley

(57) ABSTRACT

A rail segment for use in a track assembly for supporting a stirring machine and mounted to a cylindrical grain bin having a longitudinal flange with a slot in a forward end portion of the flange and a connecting hole in a second end portion of the flange.

10 Claims, 4 Drawing Sheets

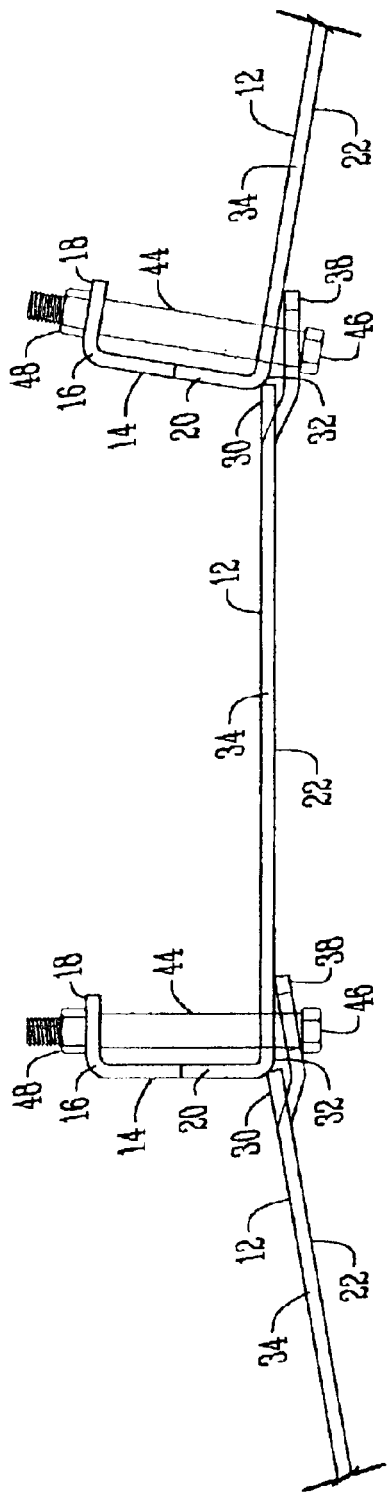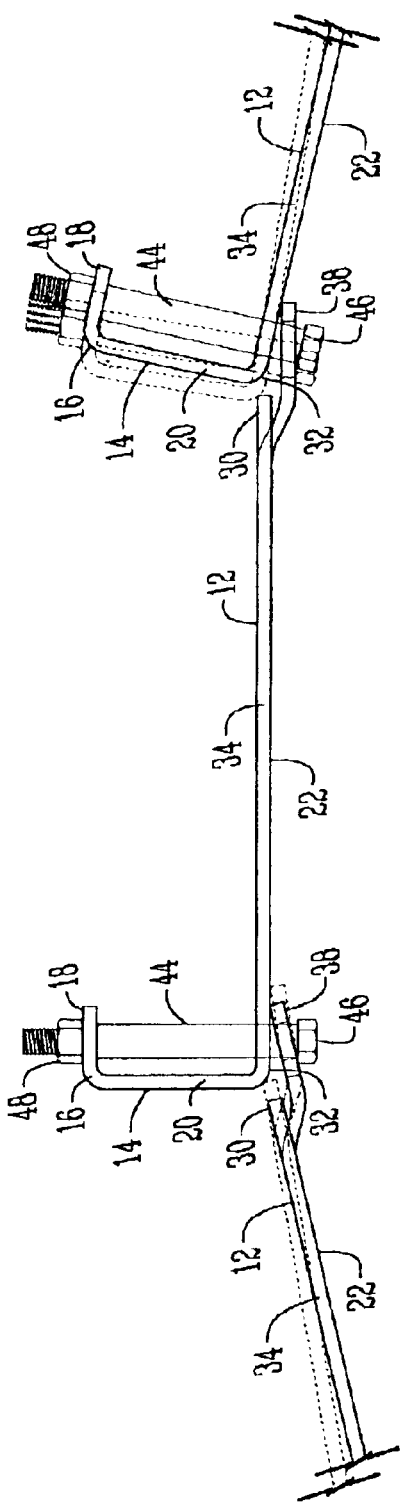

ADJUSTABLE GRAIN BIN RAIL FOR GRAIN STIRRING MACHINES

BACKGROUND OF INVENTION

This invention is directed toward an adjustable track, and more specifically to an adjustable track for supporting a stirring machine within a grain bin.

Tracks for stirring machines are well known within the art. Generally, these tracks include a single cylindrical metal ring that fits within the diameter of a grain bin at its upper edge. Because grain bins are constructed of different diameters, presently, a number of rails with different diameters must be constructed to accommodate the varying diameters of the grain bins. Not only is it expensive to manufacture a variety of rails, but it requires additional inventory storage space. As a result, a track is needed to address this problem.

Accordingly, a primary objective of this invention is to provide varying multiples of rail segments to form a track for grain stirring machines in a grain bin that can be adjusted to fit different bin diameters.

A further object of the invention is to provide a track comprised of a plurality of easy to handle track segments.

Another objective is to provide a track that is inexpensive to manufacture and distribute.

These and other objectives will become apparent to those skilled in the art based on the following disclosure.

SUMMARY OF THE INVENTION

This invention involves a rail system for supporting a grain stirring assembly in a grain storage bin.

This invention specifically involves a rail segment that has a longitudinal flange with a first end portion, a second end portion, and a rail surface on an upper edge. Located within the first end portion of the flange is a slot and located within the second end portion of the flange is a hole. A plurality of rail segments are adjustably connected by aligning the first end portion of one rail segment with the second end portion of a separate rail segment to form a substantially arcuate track.

BRIEF DESCRIPTION OF THE DRAWINGS

FIG. 4 is a top plan view of a rail segment assembly;

FIG. 5 is a top plan view of a rail segment assembly; and

DETAILED DESCRIPTION OF THE PREFERRED EMBODIMENT

Figure 1:
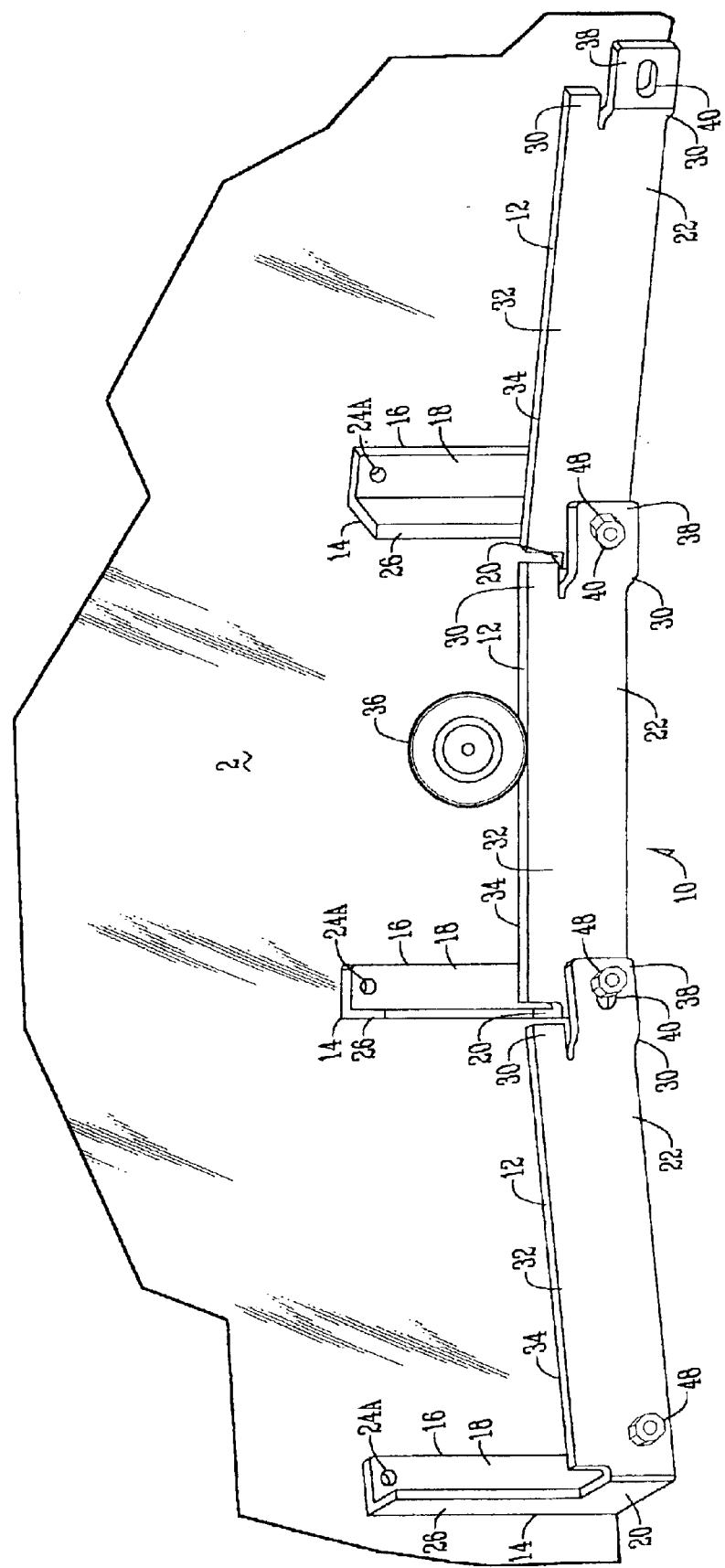
FIG. 1 is a perspective view of a rail segment assembly of this invention.
Figure 2:
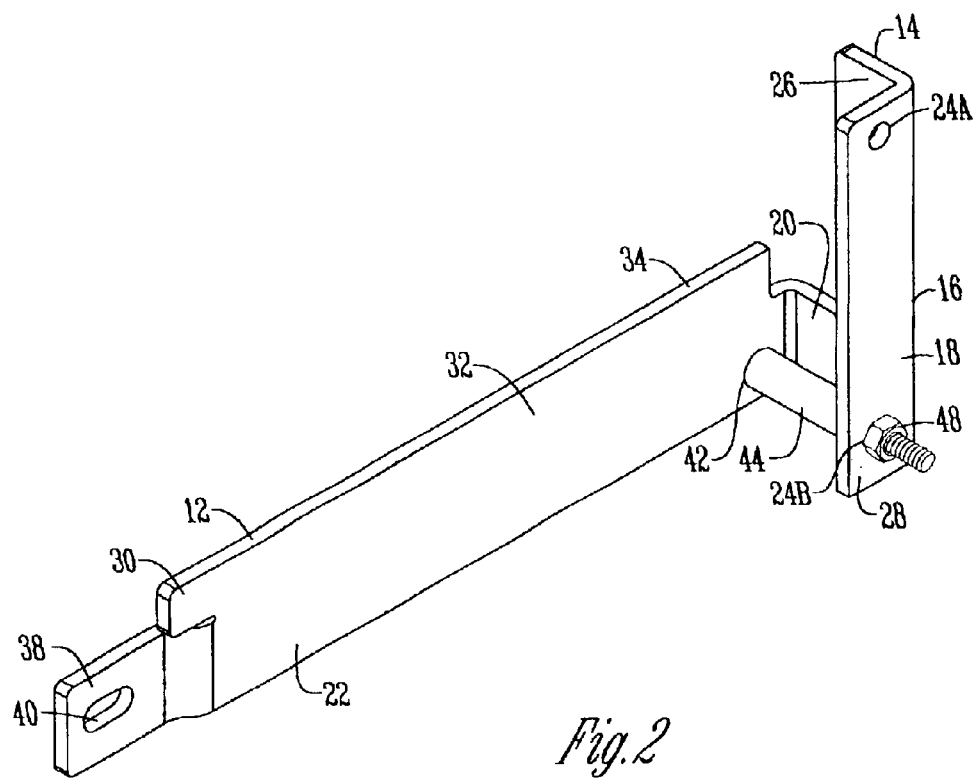
FIG. 2 is a perspective view of a rail segment.
Figure 3:
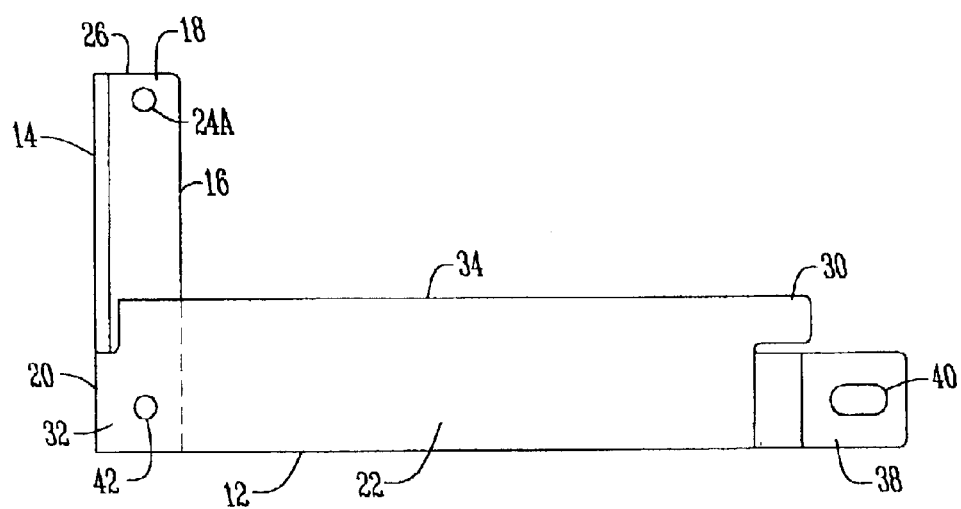
FIG. 3 is a side elevational view of a rail segment.
Figure 6:
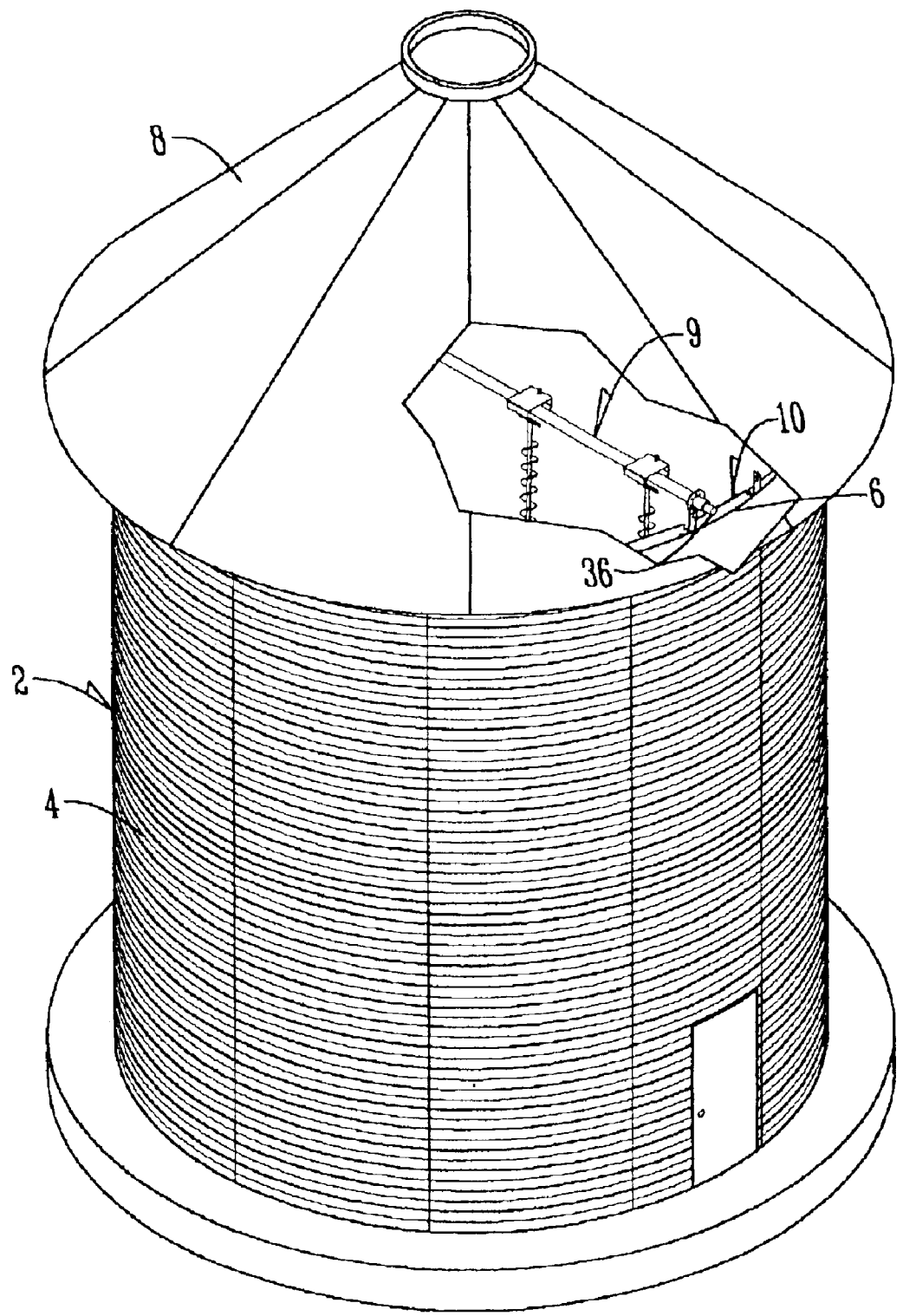
FIG. 6 is a small scale perspective of a grain bin in which this invention is mounted.

The numeral 2 (FIG. 6) designates a conventional grain storage bin with cylindrical side wall 4 having a top edge 6 and a tapered roof 8. A conventional grain stirring mechanism 9 (see U.S. Pat. No. 5,570,954) is supported at its outer end by rail segment assembly 10. The rail segment assembly 10 is designed generally for use within the grain bin 2 for supporting a grain stirring machine 9, but can also be adapted for other uses. The rail segment assembly 10 has a plurality of rail segments 12 that are connected to the upper edge 6 of the grain bin 2. While there are a number of shapes and configurations that can be used to connect the rail segment 12 to a bin 2, preferred is a bracket 14 having a vertical L-shaped member 16 with a vertical flange 18. Flange 18 terminates in a transverse flange 20 that in turn terminates into a longitudinal flange 22. The vertical flange 18 has holes 24a, 24b at both the upper end 26 and the lower end 28 of the vertical flange 18. In the drawings, the vertical L-shaped member 16 is shown extending upwardly, but it also can extend downwardly.

The longitudinal flange 22 has a first end portion 30, a second end portion 32, and an upper edge 34 that forms a rail surface for supporting wheels 36 (FIG. 6) of stirring machine 9. The first end portion 30, preferably has an offset tab 38 that extends longitudinally outside the vertical plane of the longitudinal flange 22. Positioned within the tab 38 is a slot 40, and positioned within the second end portion 32, and aligned with hole 24b on the lower end 28 of the vertical flange 18, is a connecting hole 42.

To assemble the rail segment assembly 10, the slot 40 on the first end portion 30 of one rail segment 12 is aligned with the connecting hole 42 on the second end portion 32 of a separate rail segment 12. A conventional bolt with a spacer 44 and a bolt head 46 is inserted through slot 40, thence through hole 42, and thence through hole 24b on the lower end 28 of the vertical flange 18 and connected to the upper edge 6 of the grain bin 2 with a conventional nut 48. A securing bolt (not shown) is inserted through hole 24a on the upper end 26 of the vertical flange 18 and secured to the grain bin 2 by a conventional nut. Instead of a spacer 44, a tab (not shown) extends inwardly from the transverse flange 20 and between the vertical flange 18 and the longitudinal flange 22. The purpose of the spacer 44 or tab is to provide support to prevent compression between the vertical flange 18 and the longitudinal flange 22. The offset tab 38 and the play created by the head 46 of the bolt 44 in relation to the slot 40 allows the rail segment assembly 10 to be adjusted to fit different diameters of the bin. By moving the slot 40 in relation to the bolt 44, a variety of angles can be achieved between the two rail segments to create a substantially arcuate track of different diameters. The wheels 36 of the stirring machine 9 are of sufficient diameter that movement of the stirring machine is unaffected by any spacing that occurs between the first end portion 30 of one segment 12 and the second end portion 32 of a separate segment 12. Likewise, the wheels 36 have sufficient play along a horizontal and vertical plane that the wheels will remain on a track that is substantially arcuate and thus the track does not need to be precisely continuous.

As can be seen by the foregoing disclosure, the assembly of this invention meets the identified objectives. Having thus described the invention it should be understood that numerous structural modifications and adaptations may be resorted to without departing from the spirit of the invention.

What is claimed:

1. A device for use in a cylindrical grain bin with an upper wall edge, the device supporting an outward wheel of a grain stirring machine, comprising:

a rail segment for connection to the grain bin and having a longitudinal flange with a first end portion, a second end portion, and a rail surface on an upper edge;

a slot located within the first end portion of the flange;

a connecting hole located in the second end portion; and wherein the rail segment has a bracket that terminates at an end of the longitudinal flange, said bracket adapted to connect the rail segment to the grain bin.

2. The device of claim 1 wherein the bracket has a vertical flange that terminates in a transverse flange that terminates in the longitudinal flange.

3. The device of claim 2 wherein a support is positioned between the vertical flange and the longitudinal flange.

4. The device of claim 1 wherein the first end portion further comprises a tab that extends longitudinally outside a vertical plane of the longitudinal flange.

5. A rail segment assembly for use in a cylindrical grain bin with an upper wall edge, the assembly supporting an outward wheel of a grain stirring machine, comprising:

a plurality of rail segments connected to the grain bin and having a longitudinal flange with a first end portion, a second end portion, and a rail surface on an upper edge; and the first end portion of the rail segments adjustably connected to the second end portions of separate rail segments to form a substantially arcuate track within the grain bin.

6. The assembly of claim 5 wherein the first end portion has a slot and the second end portion has a connecting hole.

7. The assembly of claim 6 wherein the first end portion further comprises a tab that extends longitudinally and outside a vertical plane of the longitudinal flange.

8. The assembly of claim 5 wherein the rail segment has a bracket that terminates in the longitudinal flange.

9. The assembly of clam 8 wherein the bracket has a vertical flange that terminates in a transverse flange that terminates in the longitudinal flange.

10. The assembly of claim 9 wherein a support is positioned between the vertical flange and the longitudinal flange.

* * * * *